No. 843,346. PATENTED FEB. 5, 1907.
A. B. & J. MACNEIL.
MANUFACTURE OF GOLF BALLS.
APPLICATION FILED MAY 23, 1906.

Witnesses:
P. F. Nagle.
L. Douville.

Inventors
Alfred Buchanan Macneil
Jeannie Macneil.
By Diedersheim & Fairbanks,
Attorneys.

UNITED STATES PATENT OFFICE.

ALFRED BUCHANAN MACNEIL AND JEANNIE MACNEIL, OF GLASGOW, SCOTLAND.

MANUFACTURE OF GOLF-BALLS.

No. 843,346.          Specification of Letters Patent.          Patented Feb. 5, 1907.

Application filed May 23, 1906. Serial No. 318,391.

*To all whom it may concern:*

Be it known that we, ALFRED BUCHANAN MACNEIL and JEANNIE MACNEIL, subjects of the King of Great Britain, both residing at 414 Victoria road, Crosshill, Glasgow, Scotland, have invented certain new and useful Improvements in the Manufacture of Golf-Balls, of which the following is a specification.

At present it is usual to make so-called "rubber-cored" balls with a hard center or nucleus and wind it round about with rubber thread or tape and thereafter inclose this core in a hard shell or covering of gutta-percha or like material. In the manufacture of golf-balls in accordance with our invention we do not follow this procedure; but we take an elastic substance, such as rubber, and mold or shape it in any usual and well-known manner into the form of a solid ball or core, and we then bind rubber thread or tape very tightly and evenly round the exterior of the core. If rubber tape is used, then before it is wound on the core the last foot or so of the tape is soaked in ordinary rubber solution or an equivalent elastic solution and allowed to dry. If rubber thread is used, then the windings are partially completed with it and finally completed with a piece of rubber tape treated wholly or partially with solution, as aforesaid. Finally we heat the ball so formed or the exterior thereof to such an extent as to render the tape with the rubber solution thereon soft, and we place the ball in a golf-ball mold and subject it to pressure. The ball is allowed to remain under pressure until it is set or cold, when it is removed from the mold and painted, colored, or otherwise treated in the usual manner. We have no hard exterior shell or cover, as usual.

In order that our said invention may be properly understood, we have hereunto appended an explanatory drawing, which shows a golf-ball as manufactured in accordance with our invention.

Figure 1:
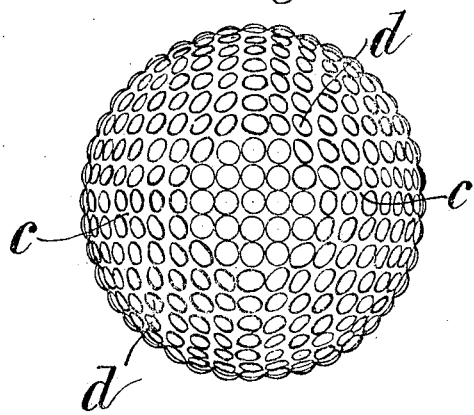
Figure 2:
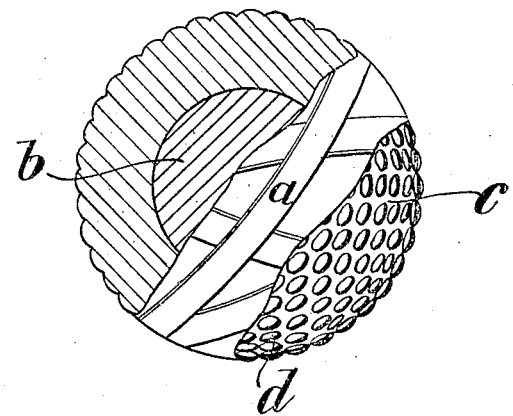

On the drawings, Figure 1 is an outside view of the golf-ball. Fig. 2 is a view, partly in section, showing the internal construction of the ball.

In carrying out our invention we prefer to adopt the following procedure: We take a thin ribbon or tape of vulcanized rubber and measuring, say, five feet long by one inch broad, and we place one end of this tape—say to the extent of one foot—in ordinary rubber solution and let it soak for a few hours. Then we withdraw the ribbon from the rubber solution and hang it up to dry for a few days. We thereafter take a solid and vulcanized rubber ball $b$ of from about fifteen-sixteenths to one and one-half inches in diameter and weighing from about one-fourth ounce to one ounce avoirdupois to form the core and wind tightly and evenly over its entire surface the foregoing prepared vulcanized-rubber ribbon or tape $a$, commencing the winding with the end of the ribbon that has no rubber solution on it. When all the ribbon or tape has been wound upon the core, it can be held in place by fastening it in any suitable manner, such as by passing the extreme end of the ribbon under one of the windings. We finally take this wound ball and heat the outside thereof to such an extent as to render the outer windings of the tape and the rubber solution thereon soft, and we then place it in a golf-ball mold and subject it to pressure. Owing to the fact that the outer windings of the ribbon, with the elastic solution thereon, are in a soft condition when the ball is subjected to pressure in the mold, the solution combining with said outer winding fills up the interstices of the mold and forms a homogeneous outer skin or covering $c$, having the usual markings $d$. We allow the ball to remain in the mold until it is cold or set, when it is removed and painted, or instead of the forgoing procedure we may take a solid and vulcanized-rubber ball of, say, about one inch in diameter and one ounce in weight avoirdupois and wind tightly and evenly all over its surface a suitable length of vulcanized-rubber thread. When this has been done, we take a thin ribbon, preferably about an inch broad and about one to two feet long, of vulcanized rubber which has been previously soaked in a rubber solution and allowed to dry, and we wind this ribbon tightly and evenly all over the convolutions of the thread. We finally heat the ball so formed and place it in a golf-ball mold and press it and allow it to remain under pressure until it is set or cold in the same manner as with the first-described method of procedure.

Of course the length and breadth, as well as the thickness, of the ribbon or tape or thread may be varied to suit the kind of ball it is desired to produce.

The central ball or core may be made not only of solid vulcanized rubber, but of other suitable and well-known elastic substance and of any suitable size. In practice we find that rubber answers extremely well; but rubber substitutes or other suitable materials of an elastic nature may be used.

The elastic solution used may be the ordinary solution employed in the rubber trade or any well-known equivalent solution. This solution may be made any desired color.

Having now fully described our invention, what we claim, and desire to secure by Letters Patent, is—

1. The process of manufacturing golf-balls which consists in taking a solid and elastic core, winding tightly and evenly thereover vulcanized-rubber windings a portion of which is treated with elastic solution and then heating the ball so made until the outer windings and the solution become soft, then placing the ball in a mold and subjecting it to pressure, and allowing it to set, then removing and finishing.

2. The process of manufacturing golf-balls which consists in winding about a core, vulcanized-rubber thread, then winding thereon rubber tape treated with an elastic solution, then heating to render the outer windings and the solution soft, then placing in a mold and allowing the same to cool and set under pressure whereby the homogeneous windings constitute the outer cover.

In testimony whereof we affix our signatures in presence of two witnesses.

ALFRED BUCHANAN MACNEIL.
JEANNIE MACNEIL.

Witnesses:
PETER MACNEIL,
FRED MIDDLETON.